US010198921B2

(12) United States Patent
Gilmore

(10) Patent No.: US 10,198,921 B2
(45) Date of Patent: Feb. 5, 2019

(54) REED SWITCH APPARATUS AND METHOD OF USING SAME

(71) Applicant: Glendell N. Gilmore, Houston, TX (US)

(72) Inventor: Glendell N. Gilmore, Houston, TX (US)

( * ) Notice: Subject to any disclaimer, the term of this patent is extended or adjusted under 35 U.S.C. 154(b) by 0 days.

(21) Appl. No.: 15/404,518

(22) Filed: Jan. 12, 2017

(65) Prior Publication Data

US 2017/0124820 A1 May 4, 2017

Related U.S. Application Data

(63) Continuation of application No. 14/494,286, filed on Sep. 23, 2014, now Pat. No. 9,580,208, which is a (Continued)

(51) Int. Cl.
*G08B 13/08* (2006.01)
*B60R 25/10* (2013.01)
(Continued)

(52) U.S. Cl.
CPC ............. *G08B 13/08* (2013.01); *B65D 25/02* (2013.01); *B65D 88/00* (2013.01); *B65D 88/12* (2013.01);
(Continued)

(58) Field of Classification Search
CPC ........ G08B 13/00; G08B 13/06; G08B 13/08; G08B 13/126; G08B 13/149; G08B 19/00;
(Continued)

(56) References Cited

U.S. PATENT DOCUMENTS 2,264,746 A 12/1941 Ellwood
2,877,361 A 3/1959 Chase
(Continued)

OTHER PUBLICATIONS

Closet Light and Other Night Lights and Other Parts in Electrical at AubuchonHardware.com; http://electrical.aubuchonhardware.com/wiring_and_boxes/night_lights_and_other_parts/closet_light-514233.asp; printed May 14, 2003.
(Continued)

*Primary Examiner* — Hung T Nguyen
(74) *Attorney, Agent, or Firm* — Ramey & Schwaller LLP

(57) ABSTRACT

A transportable container assembly including a transportable container defining an enclosed interior space and having an opening member cooperatively engaging a mounting frame. The opening member has a closed position and an open position and access to the interior space is permitted in the open position. A localized device or system is attached to the transportable container and is coupled to an electrical power source. A reed switch apparatus coupled to the transportable container communicates the position of the opening member to the localized device or system. The localized device or system provides a localized function depending on the reported position of the opening member. The localized function includes at least one of a group consisting of a local lighting function, local locking mechanism action and local refrigeration system action/function. The localized device or system communicates the position of the opening member to a remote device or system at a location remote from the transportable container. The remote device or system is capable of providing remote monitoring and control functions or actions at the transportable container depending on the communicated position of the opening member.

10 Claims, 13 Drawing Sheets

Related U.S. Application Data continuation of application No. 13/368,152, filed on Feb. 7, 2012, now Pat. No. 8,866,570, which is a continuation of application No. 11/842,290, filed on Aug. 21, 2007, now Pat. No. 8,111,119, which is a continuation-in-part of application No. 11/280,006, filed on Nov. 16, 2005, now Pat. No. 7,259,647, which is a continuation of application No. 10/369, 004, filed on Feb. 19, 2003, now Pat. No. 6,977,570.

(51) Int. Cl.

| | |
|---|---|
| ***H01H 36/00*** | (2006.01) |
| ***B65D 25/02*** | (2006.01) |
| ***B65D 88/00*** | (2006.01) |
| ***H01H 1/66*** | (2006.01) |
| ***B65D 88/12*** | (2006.01) |
| ***B65D 90/00*** | (2006.01) |
| ***H01H 50/16*** | (2006.01) |

(52) U.S. Cl.
CPC ............. *B65D 90/008* (2013.01); *H01H 1/66* (2013.01); *H01H 36/0006* (2013.01); *H01H 36/0046* (2013.01); *H01H 50/16* (2013.01); *Y10T 29/49764* (2015.01); *Y10T 29/49826* (2015.01)

(58) Field of Classification Search
CPC .... G08B 19/005; B65D 88/12; B65D 88/121; B65D 88/127; B65D 88/128; B65D 90/008; H01H 50/16
USPC ............... 340/545.6, 545.7, 545.9, 541, 542, 340/426.28, 547; 335/205, 206, 207
See application file for complete search history.

(56) References Cited

U.S. PATENT DOCUMENTS

| | | | | |
|---|---|---|---|---|
| 3,444,493 | A | 5/1969 | Nieuwhof | |
| 3,544,934 | A | 12/1970 | Poliakoff | |
| 3,789,382 | A * | 1/1974 | Oestreicher ............ | H04M 11/04 340/517 |
| 3,803,575 | A | 4/1974 | Gotanda | |
| 4,027,907 | A | 6/1977 | Crepinsek | |
| 4,170,005 | A | 10/1979 | Duke | |
| 4,210,889 | A | 7/1980 | Holce | |
| 4,258,346 | A | 3/1981 | Williams | |
| 4,319,712 | A | 3/1982 | Bar | |
| 4,409,577 | A | 10/1983 | Holce | |
| 4,465,997 | A | 8/1984 | Hines | |
| 4,737,770 | A * | 4/1988 | Brunius ................. | G08B 19/00 340/506 |
| 4,763,937 | A * | 8/1988 | Sittnick, Jr. ............. | E05B 49/00 292/251.5 |
| 4,943,791 | A | 7/1990 | Holce et al. | |
| 4,988,965 | A | 1/1991 | Borja | |
| 5,077,547 | A | 12/1991 | Burgmann | |
| 5,243,325 | A | 9/1993 | Marin | |
| 5,422,616 | A | 6/1995 | Jackman | |
| 5,559,482 | A | 9/1996 | close et al. | |
| 5,576,678 | A | 11/1996 | Saunders | |
| 5,589,811 | A | 12/1996 | Pariot | |
| 5,623,416 | A | 4/1997 | Hocker, III | |
| 5,633,626 | A | 5/1997 | Cawthorne | |
| 5,668,533 | A | 9/1997 | Jackson | |
| 5,673,021 | A | 9/1997 | Woods | |
| 5,713,621 | A | 2/1998 | Krenkel et al. | |
| 5,723,835 | A | 3/1998 | Gilmore | |
| 5,754,107 | A | 5/1998 | Ferrantelli | |
| 5,777,552 | A | 7/1998 | Fischette | |
| 5,877,664 | A | 3/1999 | Jackson | |
| 5,917,392 | A | 6/1999 | Finfera | |
| 5,980,058 | A | 11/1999 | Guess et al. | |
| 6,002,994 | A | 12/1999 | Lane et al. | |
| 6,011,469 | A | 1/2000 | Taft et al. | |
| 6,019,156 | A | 2/2000 | Wagner et al. | |
| 6,089,588 | A * | 7/2000 | Lesesky ................... | B60D 1/62 280/422 |
| 6,225,903 | B1 | 5/2001 | Soloway et al. | |
| 6,236,358 | B1 | 5/2001 | Durst et al. | |
| 6,249,224 | B1 | 6/2001 | Shoen et al. | |
| 6,304,168 | B1 | 10/2001 | Ohta et al. | |
| 6,310,548 | B1 | 10/2001 | Stephens et al. | |
| 6,348,861 | B1 | 2/2002 | Li | |
| 6,356,205 | B1 | 3/2002 | Salvo et al. | |
| 6,359,538 | B1 | 3/2002 | Jolley et al. | |
| 6,400,267 | B1 * | 6/2002 | Gordon-Levitt ... | G05B 19/0423 335/205 |
| 6,472,993 | B1 * | 10/2002 | Addy ..................... | G08B 13/08 340/539.1 |
| 6,580,355 | B1 * | 6/2003 | Milo ................... | E05B 47/0012 340/5.7 |
| 6,963,281 | B2 * | 11/2005 | Buckley ................. | G08B 13/08 335/206 |
| 6,977,570 | B2 | 12/2005 | Gilmore | |
| 7,057,484 | B2 | 6/2006 | Gilmore | |
| 7,259,647 | B2 | 8/2007 | Gilmore | |
| 8,004,393 | B2 | 8/2011 | Haber | |
| 2004/0155477 | A1 * | 8/2004 | Lanigan ............. | B62D 33/0222 296/50 |
| 2004/0160296 | A1 | 8/2004 | Gilmore | |
| 2004/0178909 | A1 | 9/2004 | Lu | |
| 2005/0077989 | A1 | 4/2005 | Edmonson, Jr. | |
| 2006/0077024 | A1 | 4/2006 | Gilmore | |
| 2007/0279165 | A1 | 12/2007 | Gilmore | |
| 2015/0287308 | A1 | 10/2015 | Shuttleworth | |

OTHER PUBLICATIONS

Introduction to the Digital Sensor; http://www.crime-prevention-products.com/closet.htm; printed May 14, 2003.
Door Alarm Detail, Roll-Up Door Contact; ftp://216/89.18.228/web/draw/Roll_Up_Door_Contact_.01.pdf; printed May 16, 2003.
Electric Door Light Switch; http://www.smarthome.com/5188.htm; printed May 14, 2003.
Learn how to install an electric switch at AubuchonHardware; http://electrical.aubuchonhardware.com/do_it_yourself_projects/how_to_install_an_electric_switch.asp; printed May 14, 2003.
Quick Switch; p. 13; printed May 16, 2003.
Final Office Action dated Apr. 15, 2005, in U.S. Appl. No. 10/369,004.
Final Office Action dated Apr. 30, 2004, in U.S. Appl. No. 10/369,004.
Final Office Action dated Feb. 25, 2011, in U.S. Appl. No. 11/842,920.
Final Office Action dated Jan. 24, 2007, in U.S. Appl. No. 11/280,006.
Final Office Action dated May 29, 2013, in U.S. Appl. No. 13/368,152.
Non-Final Office Action dated Aug. 5, 2004, in U.S. Appl. No. 10/369,004.
Non-Final Office Action dated Dec. 7, 2012, in U.S. Appl. No. 13/368,152.
Non-Final Office Action dated Jul. 11, 2016, in U.S. Appl. No. 14/494,286.
Non-Final Office Action dated May 25, 2010, in U.S. Appl. No. 11/842,920.
Non-Final Office Action dated May 3, 2006, in U.S. Appl. No. 11/21W06.
Non-Final Office Action dated Nov. 30, 2009, in U.S. Appl. No. 11/842,920.
Non-Final Office Action dated Oct. 8, 2003, in U.S. Appl. No. 10/369,004.
Notice of Allowance dated Jun. 18, 2014, in U.S. Appl. No. 13/368,152.
Notice of Allowance dated Oct. 13, 2016, in U.S. Appl. No. 14/494,286.
Notice of Allowance dated Oct. 4, 2011, in U.S. Appl. No. 11/842,920.

* cited by examiner

FIG. 7
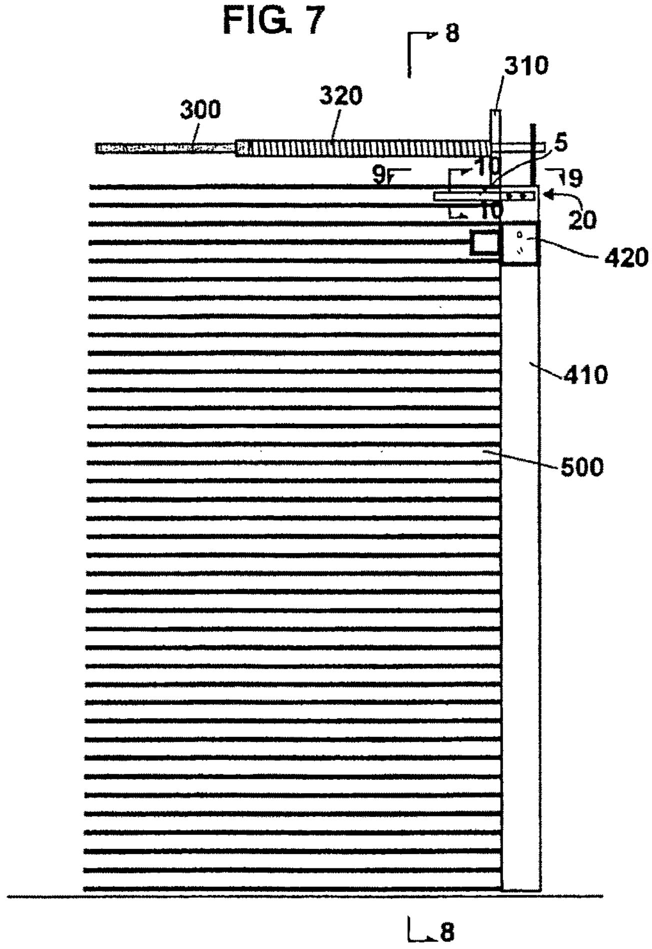
FIG. 8
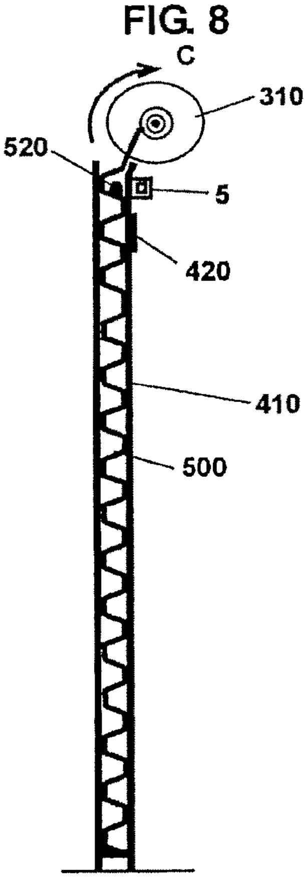
FIG. 9
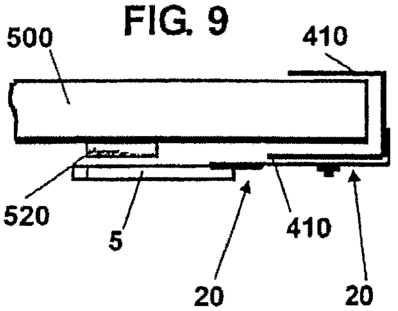
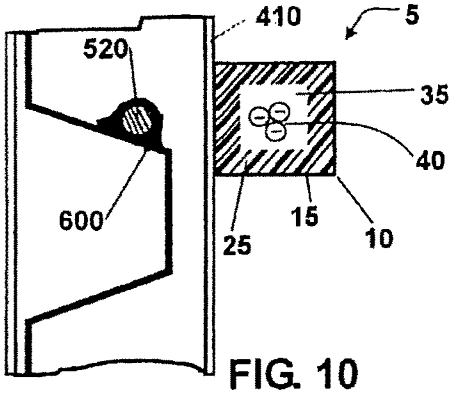
FIG. 10

FIG. 13
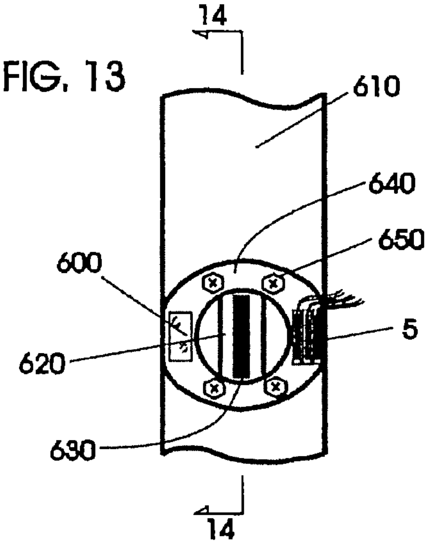
FIG. 13A
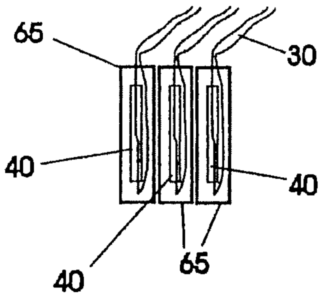
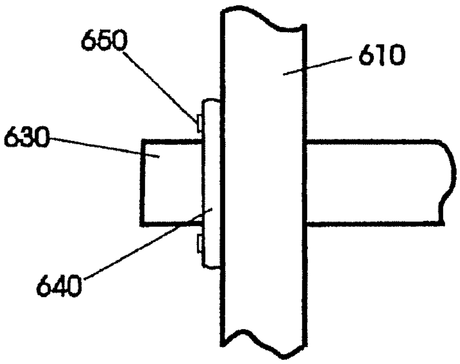
FIG. 14

FIG. 20A (N.O. SPST)
FIG. 20B (N.C. SPST)
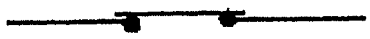
FIG. 20C (N.O. / N.C. SPDT)
FIG. 20D (N.O. DPST)
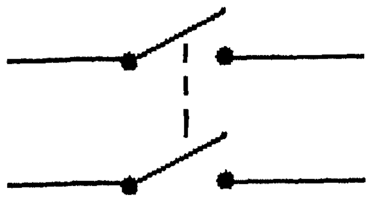
FIG. 20E (N.C. DPST)
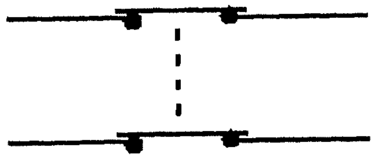

REED SWITCH APPARATUS AND METHOD OF USING SAME

CROSS-REFERENCE TO RELATED APPLICATIONS

This application is a continuation of U.S. patent application Ser. No. 14/494,286, filed Sep. 23, 2014, now U.S. Pat. No. 9,580,208, which is a continuation of U.S. patent application Ser. No. 13/368,152, filed Feb. 7, 2012, now U.S. Pat. No. 8,866,570, which is a continuation of U.S. patent application Ser. No. 11/842,920, filed Aug. 21, 2007, now U.S. Pat. No. 8,111,119, which is a continuation-in-part of U.S. patent application Ser. No. 11/280,006, filed Nov. 16, 2005, now U.S. Pat. No. 7,259,647, which is a continuation of U.S. patent application Ser. No. 10/369,004, filed Feb. 19, 2003, now U.S. Pat. No. 6,977,570.

BACKGROUND OF THE INVENTION

1. Field of the Invention

The present invention relates generally to reed switches and more specifically to the method of using one or more reed switches to control one or more devices.

2. Description of the Related Art

Reed switches are magnetically-operated switches, which are typically formed by a pair of spaced ferromagnetic contacts or blades, hermetically sealed in a glass capsule. In a typical application and use of a reed switch, the blades are connected to outside leads—each outside lead being part of a circuit. The exposure of the blades to a magnetic field—coming from either a permanent magnetic or electromagnetic generation—forces the blades to move, either contacting one another or moving away from one another. The contacts or blades may be normally-open or normally-closed. As used herein, in a normally-closed reed switch, the blades normally are not contacting each other but will close or contact each other when a magnetic field is present. In a normally-open reed switch, the blades normally contact each other but will open or separate when a magnetic field is present. Upon removal or shielding of the magnetic field from the reed switch, the blades of the normally-closed reed switch will separate or open whereas the blades of the normally-open reed switch will close or contact each other.

Generally, the reed switch is activated (that is, causing the ferromagnetic blade to move, be it closing the circuit or opening the circuit) via the use of a magnetic field. Such an activation allows communication to be established with a system or device. In some instances the communication may be the lack of a signal or electrical energy being returned when the reed switch opens the circuit, while in other instances, the communication may be the circuit being completed.

One recognized use of a reed switch is monitoring the "change of state" of something, for example a door or window, in security or burglar alarm systems. In such an example, a reed switch causes a circuit to be completed (i.e., closed) or broken (i.e., opened) when a window or door opens or closes. Typically, this change of condition (the opening or closing of the circuit) is automatically detected by a central alarm system or the like, indicating whether or not an unauthorized "change of state" has occurred. A typical security use of such a reed switch may be, for example, on a window or door assembly of a house or on a roll-up door assembly of a storage shed. In such situations, it is well known and understood that the central alarm system typically receives a low voltage signal passing through the reed switch to indicate one status of the door or window, and does not receive the low voltage signal from the open reed switch when the door or window is in another state.

With the use of reed switches to control a device, several design considerations must be taken into account. Reed switches are by their very nature fragile—that is, the glass capsules can break. An exacerbation of the fragile nature is the likelihood that two reed switches in too close proximity to one another may hit and break each other.

Biasing a reed switch. It has been known for many years by those skilled in the art that biasing a reed switch with a first stationary magnet may have a benefit in some instances. One such application of biasing a reed switch is seen in U.S. Pat. No. 2,877,361 to Chase, issued Mar. 10, 1959. The Chase patent teaches using the magnetic flux of a stationary biasing magnet next to a set of reed switch contacts of a stationary reed switch to bias the set of reed switch contacts to the "magnet present" closed state. The closed state remains until the magnetic flux of a second moving magnet or actuator magnet, attached to a movable part of an opening, is present to cancel or annul the flux field of the stationary biasing magnet away from the biased reed switch contacts. This results in the reed switch contacts changing to the "magnet not present" open state even though the biasing magnet has not moved from its stationary position next to the reed switch contacts.

Thus, biasing a stationary set of reed switch contacts with an adjacent small stationary biasing magnet, having a small magnetic flux field just strong enough to bias the set of reed switch contacts to the "magnet present state," in conjunction with a second larger magnet with a stronger magnetic flux field spaced farther away from the set of reed switch contacts is known in the prior art. When the presence of the second larger magnet's magnetic field is present on the reed switch contacts, the second larger magnet overpowers the smaller first stationary biasing magnet and the contacts change to their "magnet not present" state even though magnets are present. The second larger magnetic flux presence could be physically moved away from the set of reed switch contacts and the first stationary biasing magnet to remove the second larger magnetic flux presence from the set of reed switch contacts and biasing magnet. Alternatively, the second larger magnet could also be stationary and ferromagnetic material moved between the set of magnetically biased reed switch contacts and the second larger stationary magnet removes the second larger magnetic flux from the magnetically biased reed switch contacts to change the state of the reed switch. It is further known that a reed switch apparatus can have more than one set of reed switch contacts pre-biased by a biasing magnet.

Another technique of using a stationary biasing magnet to influence a set of reed switch contacts is taught in U.S. Pat. No. 4,943,791 to Holce et al., issued Jul. 24, 1990. A first stationary biasing magnet placed to one end of a set of reed switch contacts provides a portion of the required magnetic flux density to cause magnetic actuation or the "magnet present" state, but not enough. The remaining portion of magnetic flux density required to change the state of the reed switch contacts to the "magnet present" state is provided by a second moving magnet. By using a first stationary biasing magnet in this arrangement the reed switch contacts require less of a magnetic flux from the second moving magnet, creating a greater actuation distance to change to the "magnet present" state by the second moving magnet, resulting in a wide gap switch.

By influencing a set of reed switch contacts with a biasing magnet has shown to facilitate a certain balance between the magnetic fields of all used magnets within the equation. This balance is short lived due to constantly changing variables within the equation. The magnets, for example, lose some of their magnetic flux properties over time, resulting in inconsistent results. This inconsistency is even more evident when using not only a fixed biasing magnet, but also a fixed stationary activation magnet and controlling the magnetic field with a piece of ferromagnetic material between the fixed stationary actuation magnet and the set of reed switch contacts being biased by the fixed biasing magnet. Any inconsistency can be overcome by correctly matching all the magnets' magnetic flux properties within the equation to include a large demagnification error window graduated over time to provide a more consistent result.

Various magnetic reed switch configurations. As discussed above, a simple reed switch configuration is generally formed by one set of contacts that are part of the flexible blades within the sealed glass bulb of a reed. Other more complex configurations having more than one set of contacts exist, such as a single pole double throw switch. Following are some different combinations and configurations of magnetic reed switches illustrated schematically in FIGS. 20A-E:

Normally Open Single Pole Single Throw Switch (N.O. SPST) (FIG. 20A);

Normally Closed Single Pole Single Throw Switch (N.C. SPST) (FIG. 20B);

Normally Open/Normally Closed Single Pole Double Throw Switch (N.O./N.C. SPDT) (FIG. 20C);

Normally Open Double Pole Single Throw Switch (N.O. DPST) (FIG. 20D); and

Normally Closed Double Pole Single Throw Switch (N.C. DPST) (FIG. 20E).

Magnetic reed switches, like mechanical switches and solid state switches, utilize some sort of formed open or closed contacts in different configuration combinations held within the switch. As described above, reed switch contacts are typically encased within a sealed glass bulb filled with either a gas or vacuum-packed and typically at a different pressure than earth's atmospheric pressure to preserve the contacts from the environment. Mechanical or solid state switches may or may not be sealed in some fashion, but do employ all the contact combinations and configurations of a reed switch.

A magnetic reed switch requires some sort of magnetic flux exposed upon the reed switch for the reed switch to change state. A mechanical or solid state switch usually requires some sort of moving mechanical interaction to change state. Some forms of a solid state switch also require power in order to change states.

Transportable storage containers. In recent years the transportable storage container industry for individual and company rental applications has grown significantly. Typically, the renter contacts the storage container company, and has a portable self-storage container delivered to the renter's location from the storage company's warehouse or holding location. The renter fills the portable container with the renter's contents. Typically, the portable container may be at the renter's location from one day to several months, during which time the portable container has no alarm and is vulnerable to thieves and/or terrorists. The portable container may be used for temporary, semi-permanent or permanent storage at the renter's location. When the container is no longer needed, it is picked up empty and returned to the storage container company's warehouse or holding area.

In other instances, after the portable storage container is filled with the renter's contents, the storage company is called to pick up the filled container and transport it to the storage company's warehouse or holding area where containers are typically stacked in multiple rows in a very large area. The containers that are filled with items do not have any type of on-board security system or location device to protect the goods inside the containers.

It would be desirable to be able to easily locate a needed specific container out of rows of hundreds of stacked transportable storage containers that all look similar at the warehouse or holding area.

A problem that exists with transportable storage containers is that the portable container's openings are not protected by a security system and the container's contents are unsecured during transportation to and from the renter's location and the entire time the container is at the renter's location, whether it is used for temporary or permanent storage. The only item that typically secures the contents of the container is some type of mechanical lock, which can be physically bypassed without anyone noticing the unauthorized intrusion.

Internal lighting would also be desirable for containers that do not get adequate light when the door is open. Moreover, internal lighting would be beneficial when there is no projected sun light, such as between sunset and sun rise. In certain instances, it would be desirable to be able to automatically control a refrigeration system housed as part of the transportable storage container depending on the condition of the container's openings.

SUMMARY OF THE INVENTION

The present invention includes a method of controlling a high voltage device via the use of a single reed switch mounted, for example, to a portion of a warehouse or storage structure. Yet another embodiment of the invention includes a method of controlling a plurality of devices with a reed switch apparatus having a plurality of reed switches. When the reed switch apparatus is exposed to a single magnetic field, the reed switches are activated. The activation of the plurality of reed switches facilitates the communication with each of the plurality of devices.

The present invention includes in one embodiment a reed switch apparatus having a plurality of reed switches which communicate with a plurality of devices. In one configuration, the reed switch apparatus has been arranged and designed such that a single magnetic field can simultaneously activate all of the plurality of reed switches. In another configuration, two or more reed switches, each acting independent of one another, are simultaneously activated by a single magnetic field. Yet another embodiment of the invention includes a method of activating a device via the use of a single reed switch mounted to a portion of a warehouse structure.

Yet another embodiment of the present invention utilizes the reed switch apparatus to provide a security system and/or locating device for transportable storage containers. This is effectively and efficiently accomplished by attaching the reed switch apparatus to the openings of the storage container. The reed switch apparatus communicates the status of an opening to a system or device by either a wired or wireless means. The reed switch apparatus can be used to report the status of the openings to an onboard system or device. Depending on the status of an opening, the reed switch apparatus can be used to perform specific control functions that are determined by the local onboard system or device at the storage container. Some of the actions performed by the local onboard system or device could be to provide security for all openings, provide internal lighting, control refrigeration and provide a container location. By providing these local controls the transportable container would be self-sufficient providing its own control functions under all circumstances all the time. Additionally, the transportation storage container may be equipped to transmit and receive control and status information to and from a remote location.

BRIEF DESCRIPTION OF THE SEVERAL VIEWS OF THE DRAWINGS

A better understanding of the present invention can be obtained when the following detailed description of the disclosed embodiments is considered in conjunction with the following drawings, in which:

FIG. 7 shows another embodiment of the reed switch apparatus, illustrating one use of the reed switch apparatus;

FIG. 8 shows a cross sectional view cut across lines 8-8 of FIG. 7;

FIG. 9 shows a cross sectional view cut across lines 9-9 of FIG. 7;

FIG. 10 shows a cross sectional view cut across lines 10-10 of FIG. 7;

FIGS. 13 and 13A show another embodiment of the reed switch apparatus, having multiple housings;

FIG. 14 shows a cross sectional view cut across lines 14-14 of FIG. 13;

FIGS. 20A-E show various reed switch configurations; and

DETAILED DESCRIPTION OF THE INVENTION

Figure 2:
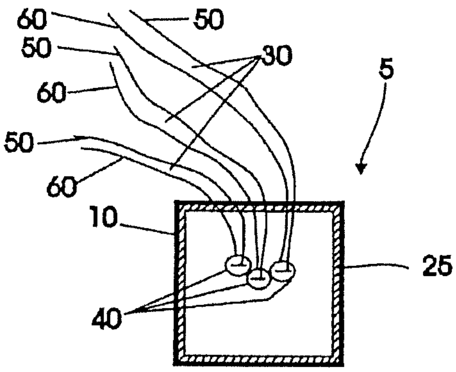
FIG. 2 shows a cross sectional view of the reed switch apparatus, cut across lines 2-2 of FIG. 1.
Figure 1:
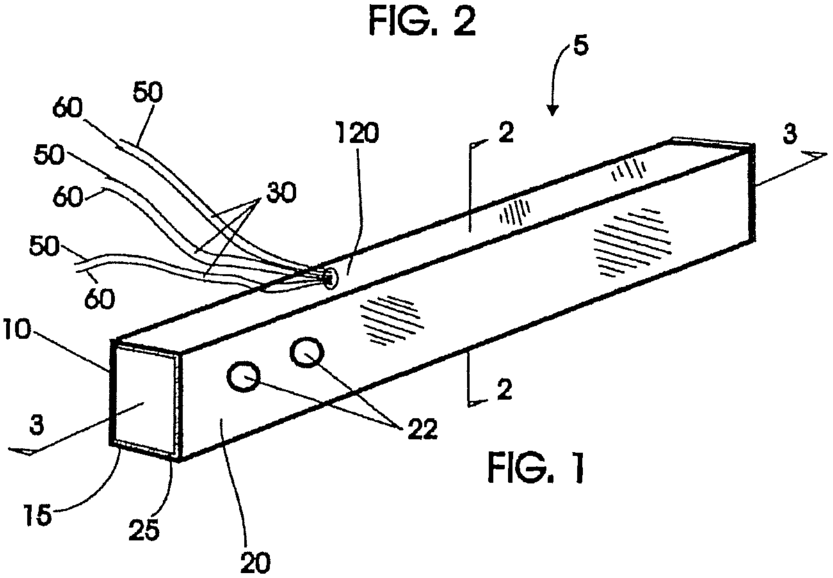
FIG. 1 shows an embodiment of the reed switch apparatus in an isolated view.
Figure 3:
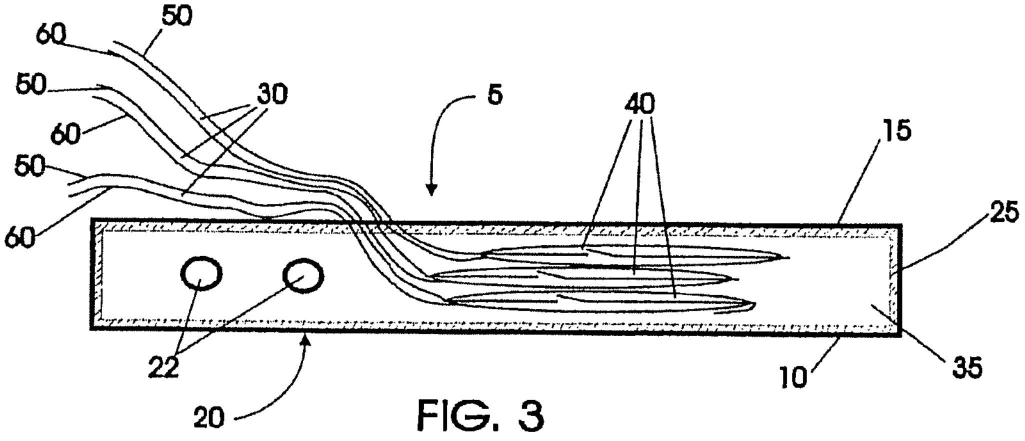
FIG. 3 shows a cross sectional view of the reed switch apparatus, cut across lines 3-3 of FIG. 1.

Several embodiments, not drawn to scale, are shown in FIGS. 1-21, illustrating several concepts of the invention. FIGS. 1-3 show, in several views, a first embodiment of a reed switch apparatus 5. The reed switch apparatus 5 in this embodiment includes a reed switch housing 10, a plurality of reed switches 40 (FIG. 3) and an attachment device 20. The reed switch housing 10 includes an outer body 15 arranged and designed as an outermost protective coating for the reed switches 40. The choice of material for outer body 15 can vary with design and intended use, but preferably the material is of such a nature that it is non-magnetic—or, will not interfere with the magnetic action of reed switches—and is strong and rigid enough to maintain its position when mounted to a specific object, e.g., a door or window. Suitable materials for outer body 15 include, without limitation, aluminum and plastic. The outer body 15 of the reed switch housing 10 can be of such a nature that it will absorb much of the impact caused by shock and forces that may be imparted to the reed switch housing 10 and ultimately the reed switches 40. Such shock and forces are undesirable as they can cause the glass capsules of reed switches 40 to break. While every embodiment of the present invention may not need additional protective measures, the preferred embodiments include a buffer to protect the reed switches 40. One such buffer is described in applicant's U.S. Pat. No. 5,723,835, which is herein incorporated in its entirety. Part of the buffer in this embodiment includes resilient material 25, which can be made of any material known for its ability to absorb mechanical energy, namely poly-foam, polystyrene, silicone, polymers and the like. This resilient material 25 fits just inside the outer body 15, preferably fitting flush therewith. In some embodiments, the resilient material 25 can fill the entire reed switch housing 10. In this embodiment, as is preferably the design, the buffer also includes a gas blend 35 placed inside the resilient material 25, which fluidly isolates the reed switches 40. The gas blend 35 suspends the reed switches 40 to help the reed switches 40 from coming in contact with the outer body 15, and also from coming in contact with one another. One such gas blend is an ammonia methanol by-product produced from curing of silicone, when silicone is used as the resilient material 25.

While not shown in the embodiment of FIGS. 1-3, it is to be understood that the buffering of the reed switches 40 can include a mechanical energy-absorbing material placed on the outside of the reed switches 40. Such materials can include, for example, shrink-wrapped plastic, a rubber coating, or the like.

While the reed switch housing 10 shown in FIGS. 1-3 has been shown with reference to one central compartment or cavity that houses all the reed switches 40, other embodiments may include a reed switch apparatus 5 which utilize several compartments or housings. One such example is described below with reference to FIG. 13A. The dynamics, intended use, and materials ultimately used will to a certain degree dictate the type of structure which can be used for the reed switch device 5 and corresponding housing for the reed switches 40.

Referring to FIG. 2, extending from the reed switch housing 10 at opening 120 (FIG. 1) are leads 30, attached to the reed switches 40. In this embodiment, a pair of leads 30 corresponds to each reed switch 40. Each pair of leads 30 includes a common 50 and a switch control signal 60. As shown in FIGS. 2 and 3, the reed switches 40 are in such proximity to one another that a single magnetic field (not shown) can activate all the reed switches 40. The activation of one of the reed switches 40 can include, as briefly described in the background, the closing of a normally-closed switch or the opening of a normally-open switch. Once again, "normal" in this sense means a state where the reed switch 40 is exposed to a magnetic field (for example, the actuating magnet being within close proximity to the reed switch). While three reed switches 40 are shown in FIGS. 1-3, two or more can be used in practice. Additionally, the reed switches 40 can include a combination of switches—including, but not limited to, those described above with reference to this embodiment.

Also shown in this embodiment is attachment device 20. In this embodiment, attachment device 20 comprises a mounting hole 22, which facilitates the installation of the reed switch apparatus 5. Other attachment devices 20, which should become apparent to those skilled in the art, can be used—some of which are described in the embodiments below.

In practice, the reed switch apparatus 5 can be placed in a selective location. Upon exposure of the reed switches 40 inside reed switch apparatus 5 to a magnetic field (not shown), the reed switches 40 are forced or activated (opening or closing—depending on the type of reed switch 40 being used) being forced into the normal state. In this embodiment, each of the reed switches 40 can either complete or open a circuit, via leads 30 through a common 50 and a switch control signal 60, communicating with one of the many devices used in various industries. This communication from reed switches 40, while not shown in this embodiment can be routed to a hardwired device, sent to a control module, or sent to a device which is in wireless communication with one of the leads 30.

Figure 4:
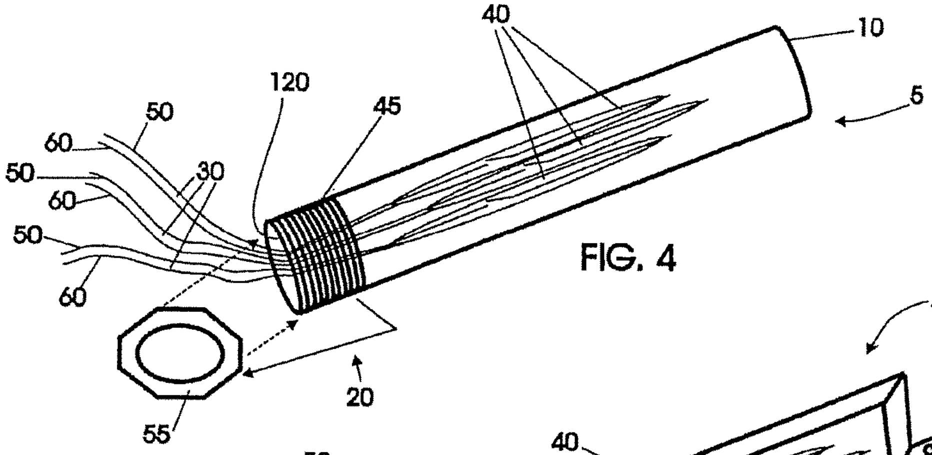
FIG. 4 shows another embodiment of the reed switch apparatus with a threaded round switch housing.
Figure 6:
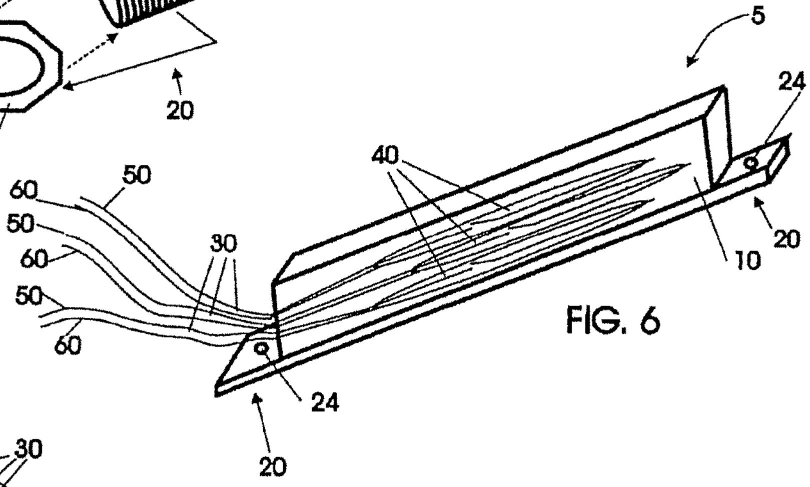
FIG. 6 shows another embodiment of the reed switch apparatus with a housing arranged and designed to fit on a door or window.
Figure 5:
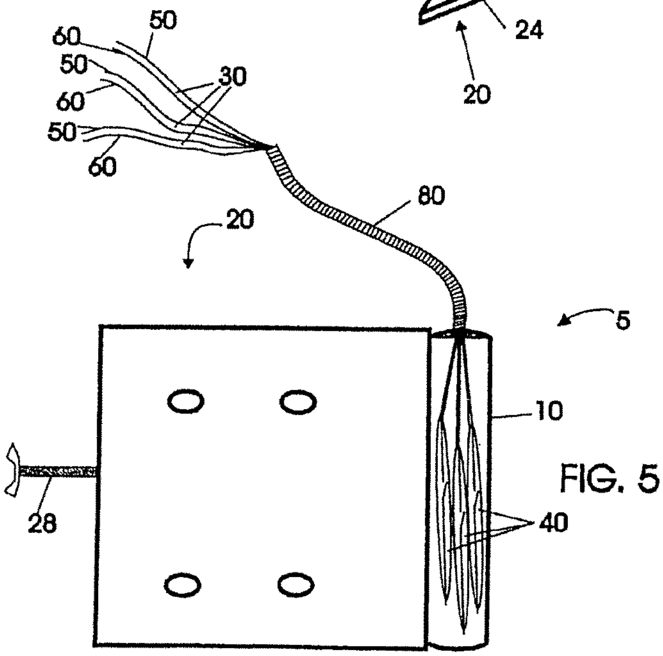
FIG. 5 shows another embodiment of the reed switch apparatus with a housing arranged and designed to be placed on a door track.

FIGS. 4-6 each show an alternative embodiment of reed switch apparatus 5. In all three embodiments, the reed switch apparatus 5 operates with a similar concept to that described in FIGS. 1-3, with slight differences. In FIG. 4, the reed switch housing 10 is a threaded, round switch housing and three reed switches 40 are being used. The use of a tubular design allows unique structural advantages over other designs as will be appreciated by one of ordinary skill in the art of structural dynamics. Additionally, the tubular design will allow insertion of the reed switch apparatus 5 in a structure designed to receive round structures—e.g., in the door drum of a roll up door. Shown in phantom view are three reed switches 40 with three sets of leads 30 (also, partially shown in phantom view) connected thereto. The three sets of leads 30 extend out through an opening 120 in the end of the reed switch housing 10. At the end of the reed switch housing 10 and adjacent to opening 120 is the attachment device 20, which in this embodiment includes threading 45 corresponding to a nut 55. While three reed switches 40 have been shown in this embodiment, more or fewer can be used in practice.

In FIG. 5, the reed switch housing 10 is arranged and designed to fit on a track of a roll-up door. Shown in phantom view are the three reed switches 40 with three sets of leads 30 connected thereto. In this embodiment, the three sets of leads 30 are fed into an armored cable housing 80 upon exiting the reed switch housing 10. The armored cable housing 80 protects leads 30 outside of the reed switch housing 10. The attachment device 20 in this embodiment includes attachment via a wing nut 28.

In FIG. 6, the reed switch housing 10 is arranged and designed to fit on a door or window. Shown in phantom view are three reed switches 40, which connect to the three sets of leads 30. The three sets of leads 30 extend out through an opening 120 (not shown in this view) in the reed switch housing 10. The attachment device 20 in this embodiment includes attachment holes 24—which allow mounting via the use of nails, screws or pop rivets.

Figure 6A:
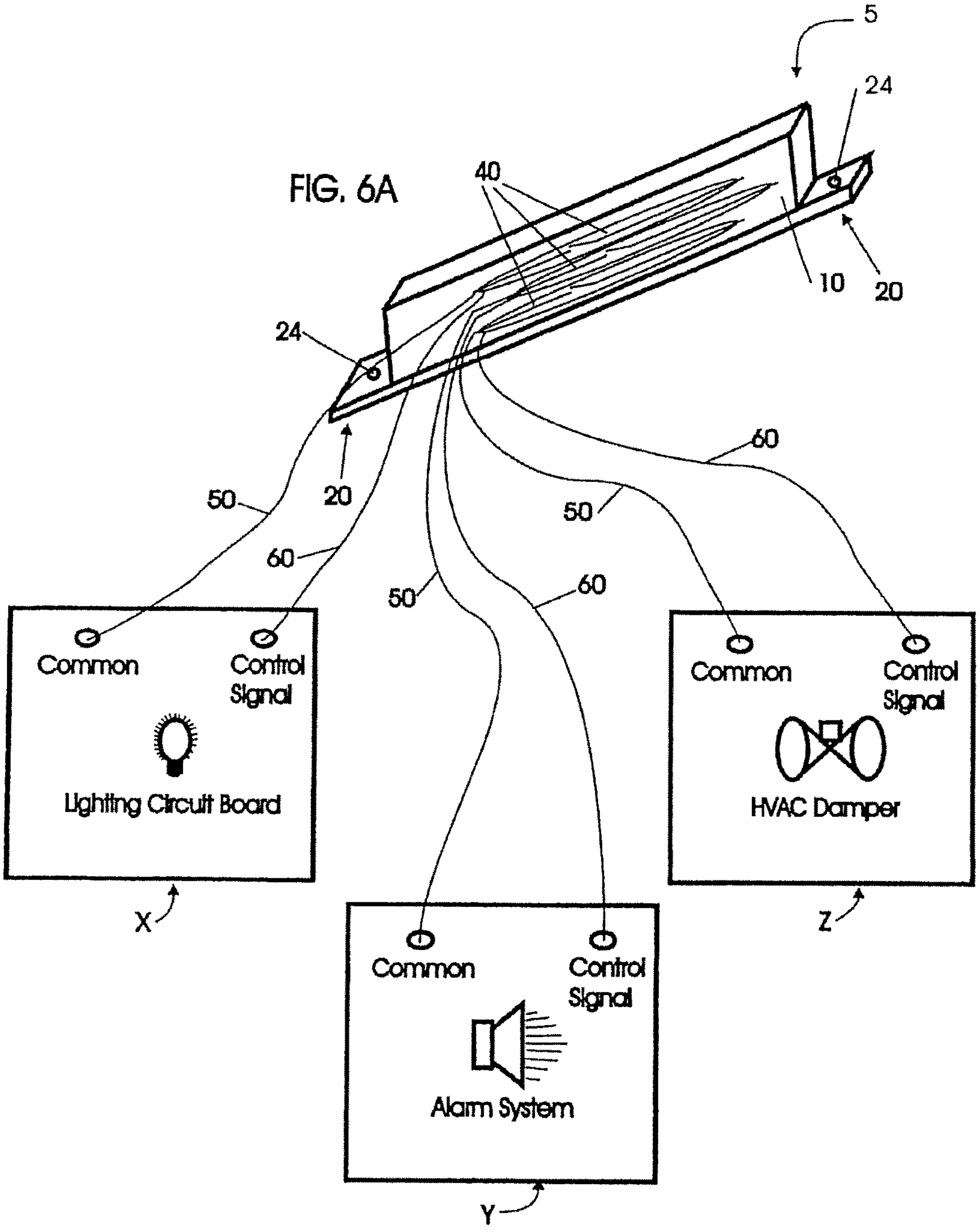
FIG. 6A shows an illustrative embodiment of a use of the reed switch apparatus of FIG. 6 in the control of multiple devices.

FIG. 6A is an illustrative embodiment of a use of the reed switch apparatus 5 shown in FIG. 6 to control multiple systems or devices. In this illustrative embodiment, each of the three reed switches 40 in the reed switch apparatus 5 interfaces or communicates with a separate system or device. Each device or system in this embodiment is independent of the other device(s) or system(s), utilizing its own reed switch 40 with corresponding control signal lead 60 and corresponding common lead 50 to be able to operate properly. In other words, the devices or systems do not use a common reed switch. In other embodiments, to the extent foreseeable by one of ordinary skill in the art, each of the reed switches 40 in reed switch apparatus 5 can communicate a signal, which ultimately controls several devices. The systems or devices have been indicated in this embodiment as a lighting circuit board X, alarm system Y, and HVAC damper Z. In this interface, an electrical signal can be sent through switch control lead 60. When the device's corresponding reed switch 40 is closed (for example, when the magnet is present), the electrical signal will be relayed back through the common lead 50, indicating to that device or system that its circuit is closed. All three reed switches 40 in this embodiment are normally-closed. As such, the signals from the switch control leads 60 are not relayed back through the common leads 50 when not exposed to the magnetic field. When the reed switch apparatus 5 is exposed to the magnetic field (for example, by placing a magnet within close proximity to the reed switch apparatus 5), the reed switches 40 move to the closed position and the communicative signal is relayed back to each respective device or system—e.g., the circuit is closed. When the reed switch apparatus 5 is not exposed to a magnetic field (for example, removing a magnet from close proximity to the reed switch apparatus 5), the reed switches 40 move to the open position and the communicative signal is no longer relayed back to each respective device or system—e.g., the circuit is open. In this regard, it should become apparent to one of ordinary skill in the art that each device or system (e.g., X, Y or Z) can determine what actions to take upon either receiving a signal or not receiving a return signal. For example, the alarm system can activate upon the lack of a signal being returned.

As another example, intended for illustrative purposes only, the reed switch apparatus 5 can include two reed switches 40—one that is normally-open and one that is normally-closed (not shown). The reed switch apparatus 5 can be placed on a window near a magnet, such that when the window is closed, the magnetic field causes both reed switches 40 to be in the activated state. In this illustration, the normally-open reed switch 40 can interface or communicate with an internal siren and the normally-closed reed switch 40 can communicate with a security system. With both reed switches 40 being activated, the security system in communication with the normally-closed reed switch 40 receives an electrical signal, while the internal siren in communication with the normally-open reed switch 40 does not receive an electrical signal. When the window is open, the magnetic field is removed from the reed switches 40 and returns the reed switches 40 to their non-normal state—in this case, the switch to the internal siren being closed and the switch to the security system being opened. The security system, in not receiving a return signal because of the open circuit, recognizes that the window is open and the siren, in receiving the electrical signal because the circuit is closed, initiates.

While several structures have been shown with reference to the embodiments of FIGS. 1-6, the actual dynamics and physical features of the reed switch housing 10 will depend on the desired use.

In operation, the embodiments of the reed switch apparatus 5 described with reference to FIGS. 1-6 can be used in many applications to control a multiplicity of devices when exposed to a single magnetic field. In this regard, the reed switch apparatus 5 can utilize several reed switches 40, each of the reed switches 40 being either normally-opened or normally-closed. As the reed switches 40 are closely packed or sandwiched in close proximity to one another, they can all be activated at the same time with a single magnetic field. The magnetic field, as will be commonly recognized by one of ordinary skill in the art, can be created by either a permanent magnet or one generated through an electromechanically activated coil. Utilizing several of these reed switches 40 in reed switch apparatus 5 allows communication to be established with several devices at the same instance, but independent of one another. In other words, each of the reed switches 40 in reed switch apparatus 5 need not utilize a common circuit; each of the reed switches 40 can have its own circuit As mentioned herein, in some embodiments the reed switches 40 in the reed switch apparatus 5 can communicate with several devices. With these embodiments, as well as others described herein, the channels of communication can be in many forms. In simpler embodiments, a direct hard wired communication channel is used where the communicative signal is sent or received directly from the leads 30 of the reed switch apparatus 5. In other embodiments, the communicative signal can be sent across a wireless connection. As one example, the wireless communication can be digital, being based upon the Institute of Electrical and Electronics Engineers 802.12 wireless standard (IEEE 802.12, 1998 Edition (ISO/IEC 8802-12:1998)) or those based upon the Bluetooth wireless standard. Other wireless communications include infrared, radio signals, and the like. In other embodiments, the channels of communication can include various combinations.

FIGS. 7-10 illustrate one use of the preferred embodiment of the reed switch apparatus 5. This illustration is intended to only be explanatory thereof and is not intended to preclude other uses, which are available to the extent foreseeable by one of ordinary skill in the art. Generally shown in FIG. 7 is a door 500 of the roll-up type, which is flexible enough to move from a vertically closed position to its rolled-up position at the top of the guide track 410. As shown in FIG. 8, the door 500 is corrugated permitting it to coil up on a rotatable support rod 300. A disc 310 is mounted on each end of the rotatable support rod 300 for retaining each end of the door 500 as it is wound up. Items typically used in such roll-up doors are also shown, including a door stop 420, which prevents the door 500 from further rotation around support rod 300 when a door plate (not shown) on the bottom of the door 500 comes in contact therewith.

The reed switch apparatus 5, as mentioned above, can be mounted in several places—dependent on use. In FIG. 7, the reed switch apparatus 5 is shown mounted via attachment device 20 to the guide track 410 of the roll-up door 500. A single reed switch apparatus 5 with multiple reed switches 40 such as this can interface with multiple systems. Such a multiple system interface is discussed below with reference to FIGS. 11 and 12. When the door 500 is completely closed, a magnet 520 (in this embodiment, shown as a permanent magnet) is in close proximity to the reed switch apparatus 5 (seen in FIGS. 7-10). This magnet 520, as indicated with references to the several embodiments, forces the reed switch 40 to either close a circuit or open a circuit (depending on whether each of the reed switches 40 is a normally-open reed switch or a normally-closed reed switch 40).

FIG. 8 is a section view cut across lines 8-8 of FIG. 7, showing the reed switch apparatus 5 in close proximity with the magnet 520. In this view, the reed switches 40 in reed switch apparatus 5 would be active or in an "normal" state as the magnet 520 is in close proximity to reed switch apparatus 5. As the door 500 rolls up and around the disc 310 (generally indicated in the direction of arrow C), the magnet 520 moves out of close proximity and the reed switches 40 are no longer activated.

FIG. 9 is a section view cut across lines 9-9 of FIG. 7, showing the details of mounting the reed switch apparatus 5 to the track 410 via the attachment device 20. As can be seen in this figure, the attachment device 20 can be a bracket—allowing the reed switch apparatus 5 to indirectly connect to the guide track 410.

FIG. 10 is a section view cut across lines 10-10 of FIG. 7, showing in a more detailed view the reed switch apparatus 5 in close proximity to the magnet 520. The reed switch apparatus 5 has been mounted to the track 410 via the attachment device 20. As can be seen in this figure, several reed switches 40 are preferably housed within the reed switch housing 10. The reed switch housing 10 preferably operates in a similar manner to that described with reference to FIGS. 2 and 3, the switch housing 10 including an outer body 15 and a buffer with a resilient material 25 and a gas-blend 35. This buffer helps protect the reed switches 40 from breaking. While such a buffer is the preferable design, it is to be understood that buffers need not be utilized in every embodiment and that other buffers can be used to the extent foreseeable by one of ordinary skill in the art. Preferably, the magnet 520 is mounted to the door 500 via mounting material 600 such as silicon. As the reed switch apparatus 5 is within close proximity to the magnet 520, the reed switches 40 are activated or in the normal state. When the door 500 moves up and the magnet 520 moves away from the reed switch apparatus 5, each reed switch 40 changes to its non-normal state.

While the reed switch apparatus 5 has been described as utilizing a plurality of reed switches 40 in some embodiments, in other embodiments the reed switch apparatus 5 may include only a single reed switch 40 to activate a device adapted for use with a warehouse storage structure. In such an embodiment, the warehouse storage structure can be one of those known in the art—e.g., including, but not limited to public storage facilities, military storage warehouses, airport hangers/storage, port warehouse storage, rail warehouse storage, manufacture storage warehouses and the like. The device (in which the reed switch 40 communicates in these embodiments) can include a light, air conditioning system (HVAC), or the like. As an illustrative example and with general reference to the embodiment in FIG. 7 (discussed above), the reed switch apparatus 5 could utilize one reed switch 40. When that reed switch 40 becomes exposed to a magnetic field (e.g., in one of the manners described above), communication between the reed switch 40 and the device can be facilitated (e.g., in one of the manners described above). The facilitation of this communication, in turn, allows the magnetically exposed reed switch 40 to activate the device (e.g., light or air conditioning system) off or on—depending on the reed switch 40 being utilized.

With the use of such an embodiment, electrical costs can be saved. For example, once again with general reference to the embodiment in FIG. 7 (discussed above), a reed switch apparatus 5, mounted to a door track 410, having a single reed switch 40 can activate a light. Upon opening the door 500, the reed switch 40 deactivates (via removal of the magnetic exposure as described above) and communicates with the light to ultimately activate the light (e.g., turn it on). Contrariwise, the closing of the door 500 applies the magnetic exposure to activate the reed switch 40—thus, turning off the light. Thus, as can be seen the activation of the light between the on and off positions can be automatic as the door 500 opens and closes.

Figure 11:
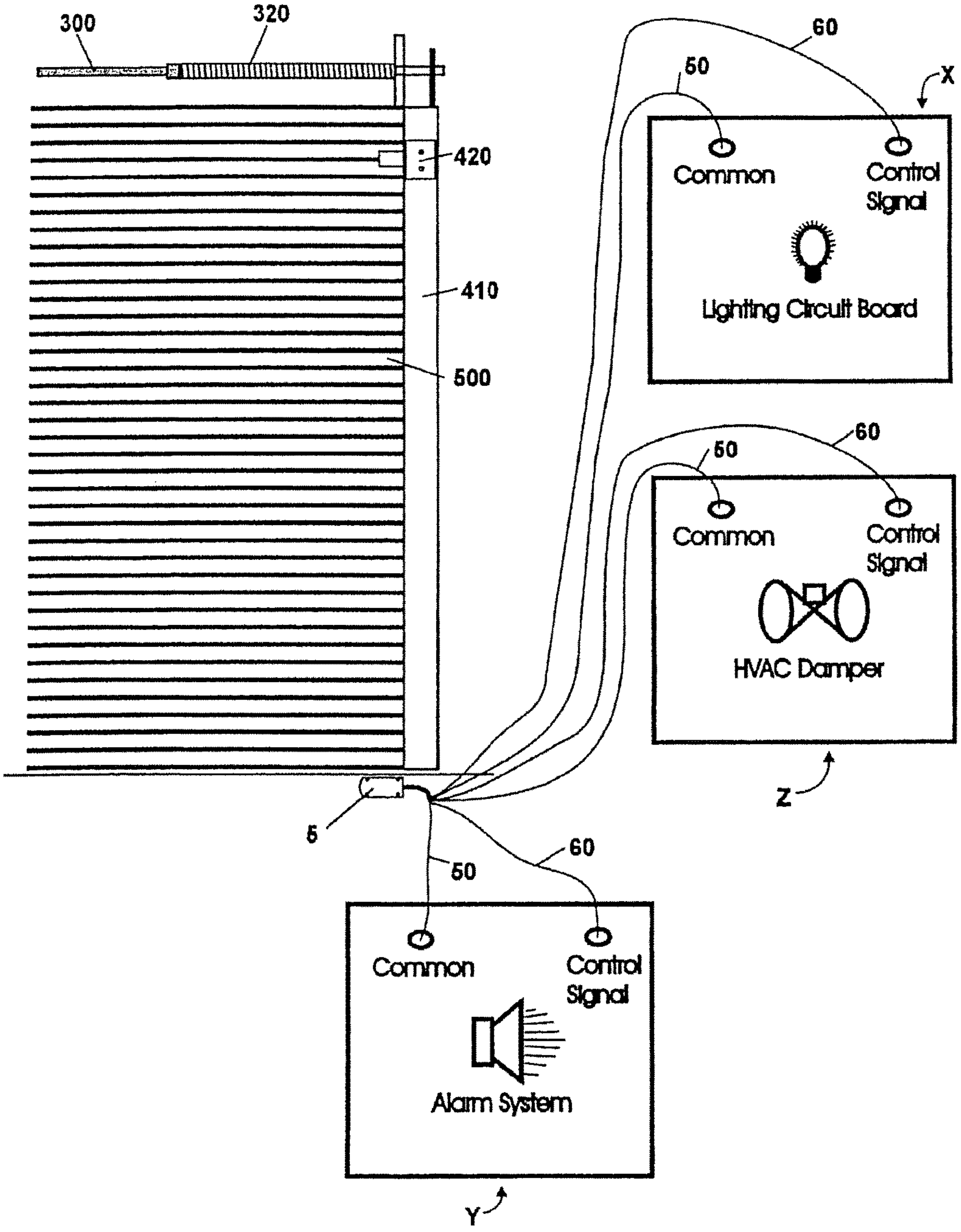
FIG. 11 shows an illustrative embodiment of a use of the reed switch apparatus of FIGS. 7-10 in the communication with multiple devices.

FIG. 11, as indicated above, illustrates the use of a single reed switch apparatus 5 with multiple reed switches 40 (not seen in this embodiment due to perspective) on a roll-up door interfacing with multiple systems or devices. In the embodiment of FIG. 11, reed switch apparatus 5 is mounted on the floor. In the control of multiple devices, the reed switch apparatus 5 in FIG. 11 can, for example, utilize three reed switches 40—one being normally-closed and two being normally-open. Each of these three reed switches 40 is designed to communicate with only one system or device. In this embodiment, the first normally-closed reed switch 40 communicates with an alarm system Y, the first normally-open reed switch 40 communicates with an HVAC damper Z, and the second normally-open reed switch 40 communicates with a light X. When the door 500 is closed, the magnet 520 (not shown) is in close proximity to reed switch apparatus 5 and hence all three reed switches 40 are in the normal position. As such, the normally-open reed switches 40 have an opened circuit (the light X and the HVAC damper Z) and the normally-closed reed switch 40 has a closed circuit (the alarm system Y). When the door 500 is opened, the magnet 520 moves out of close proximity, completing the circuit for the normally-open switch (turning on light X and the HVAC damper Z) and opens the circuit for the normally-closed reed switch 40 (alarm system Y does not receive signal—indicating the door is open). All devices or systems are signaled simultaneously when one single magnet is moved within close proximity to the reed switch apparatus 5, insuring that all the devices or systems work together seamlessly.

Figure 12:
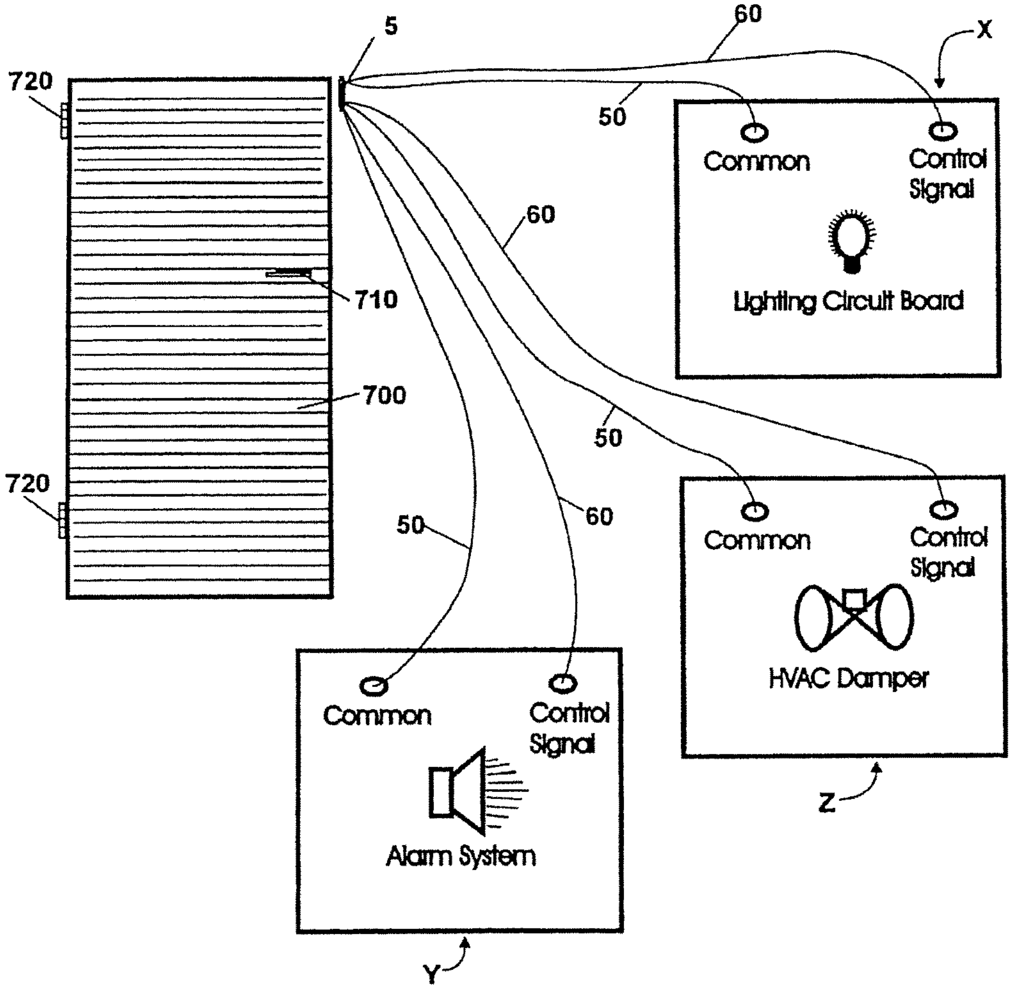
FIG. 12 shows another illustrative embodiment of a use of the reed switch apparatus in the communication with multiple devices.

FIG. 12, in a manner similar to that described with reference to FIG. 11, illustrates the use of a single reed switch apparatus 5 with multiple reed switches 40 (once again, not seen in FIG. 12 due to perspective) interfacing with multiple systems or devices. The devices or systems have been indicated as a lighting circuit board X, an alarm system Y, and an HVAC damper Z. In this embodiment, reed switch apparatus 5 is shown mounted at an adjacent location to a swing door 700—for example, of the type that could be utilized with a storage shed or the like, including standard features such as hinges 720 and a latch 710. The magnet (not shown) can be mounted on an inside portion of the swing door 700 such that when the swing door 700 is closed, the reed switch apparatus 5 is within close proximity to the magnet (not shown).

FIGS. 13 and 14 show another embodiment of the reed switch apparatus 5 being utilized on a door track 610. In this embodiment, the magnet 600 and reed switch apparatus 5 remain in a single location while a door latch 630 interrupts the exposure of the magnetic field from magnet 600 on the reed switches 40 of the reed switch apparatus 5. Both the reed switch apparatus 5 and magnet 600 are mounted to the door track 610 via an attachment device 640 and attachment screws 650. The door track 610 has a hole 620 which is arranged and designed to receive a door latch 630.

As shown in FIG. 14, the door latch 630 extends through the hole 620 between the magnet 600 and reed switch apparatus 5, interrupting the exposure of the magnetic field caused by magnet 600 on reed switch apparatus 5. When the door latch 630 is removed from a location between the magnet 600 and reed switch apparatus 5, the magnetic field from magnet 600 once again is exposed to the reed switch apparatus 5.

FIG. 13A shows a more detailed view of the reed switch apparatus of FIG. 13. As can be seen in this configuration, the reed switch apparatus 5 need not have a single housing surrounding the reed switches 40. Rather, as can be seen in this embodiment, the reed switch apparatus 5 has three reed switches 40—each with its own housing 65. Therefore, it is to be expressly understood with the embodiments, generally described herein, that a single housing 10 (seen, for example, in the embodiment of FIGS. 1-3) can be a multiplicity of housings 65 (seen, for example, in the embodiment of FIGS. 13 and 13A).

Figure 15:
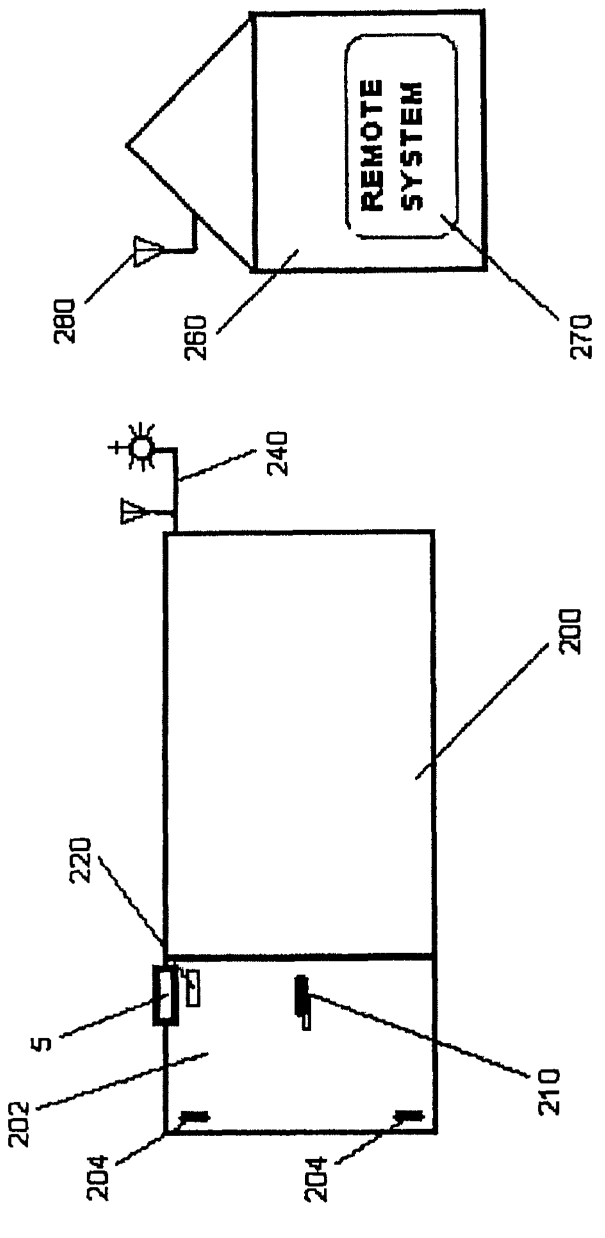
FIG. 15 shows an illustrative embodiment of the present invention in which a transportable storage container is in communication with a remote system at a remote location.
Figure 16:
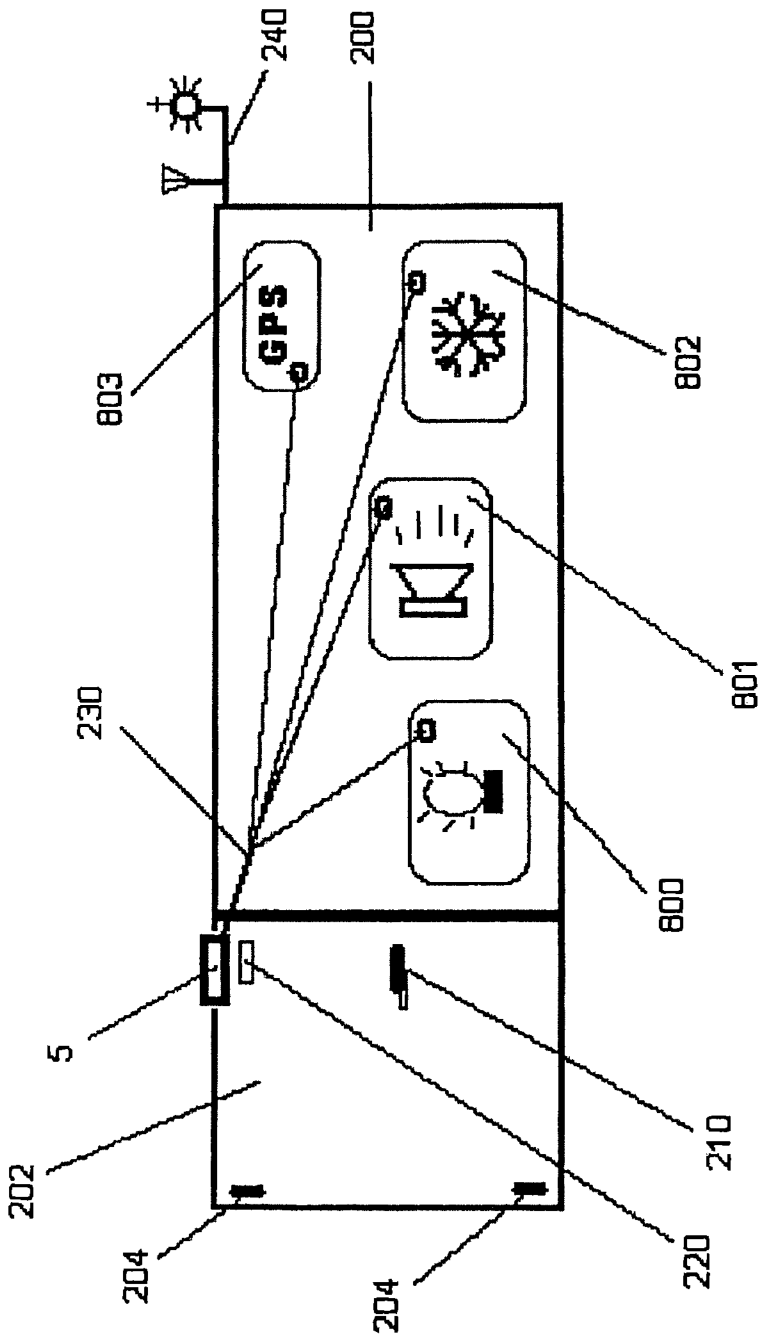
FIG. 16 shows the switch apparatus in communication with multiple devices or systems within the transportable storage container.

FIGS. 15 and 16 illustrate another embodiment of the present invention in which the reed switch apparatus is used with transportable storage containers. With reference to FIG. 15, a transportable storage container 200 includes one or more openings 202, typically doors, for accessing the interior of the transportable storage container 200. The transportable storage container 200 is shown having a door 202 mounted to the container 200 with hinges 204 and a latch 210. In the typical prior art transportable storage container, the container's openings are not protected by a security system and the container's contents are secured only by some type of mechanical lock which can be physically bypassed without anyone noticing the unauthorized intrusion.

A reed switch apparatus 5, preferably a multi-contact reed switch apparatus, and an actuation magnet 220 are preferably attached at the opening(s) 202 of the transportable storage container 200 in one of the manners previously described. The reed switch apparatus 5 communicates the status of the opening 202 to one or more systems or devices by either a wireless or wired means. FIG. 16 shows a wired communication media 230 between the reed switch apparatus 5 and all the different systems or devices located onboard the transportable container 200. The transportable storage container 200 is shown in FIG. 16 as being equipped with a lighting system 800, an alarm system 801, a refrigeration system 802, and a global positioning system (GPS) 803. The local GPS device or system 803 is for container tracking and transmitted/received information processing as described below. It is to be understood that the present invention is not limited to the illustrated systems/devices 800-803 shown, nor does the present invention require all of these systems or devices. Preferably, the reed switch apparatus 5 reports the status of the opening 202 to the onboard system(s) or device(s). Depending on the status of the opening 202, specific control functions are performed by the local onboard system(s) or device(s) at the transportable storage container 200. For example, internal lighting in the container 200 is controlled by the local onboard lighting system 800; security for the opening(s) 202 is controlled by the local onboard alarm system 801; refrigeration is controlled by the refrigeration system 802; and the container tracking along with remote and local control functions are transmitted and received to and from the container and remote system via GPS device 803. By providing these local controls the transportable container 200 would be self-sufficient providing its own control functions under all circumstances all the time.

Still referring to FIGS. 15 and 16, the transportable storage container 200 preferably includes a local antenna and solar panel 240. The solar panel is provided for charging a local battery (not shown) on the container 200 and the local antenna is for receiving remote control function information from and transmitting local control function information to a remote location 260. As shown in FIG. 15, the remote location 260 preferably houses a remote device or system 270 and includes a remote antenna 280 for receiving and transmitting information to and from the transportable storage container 200.

Figure 17:
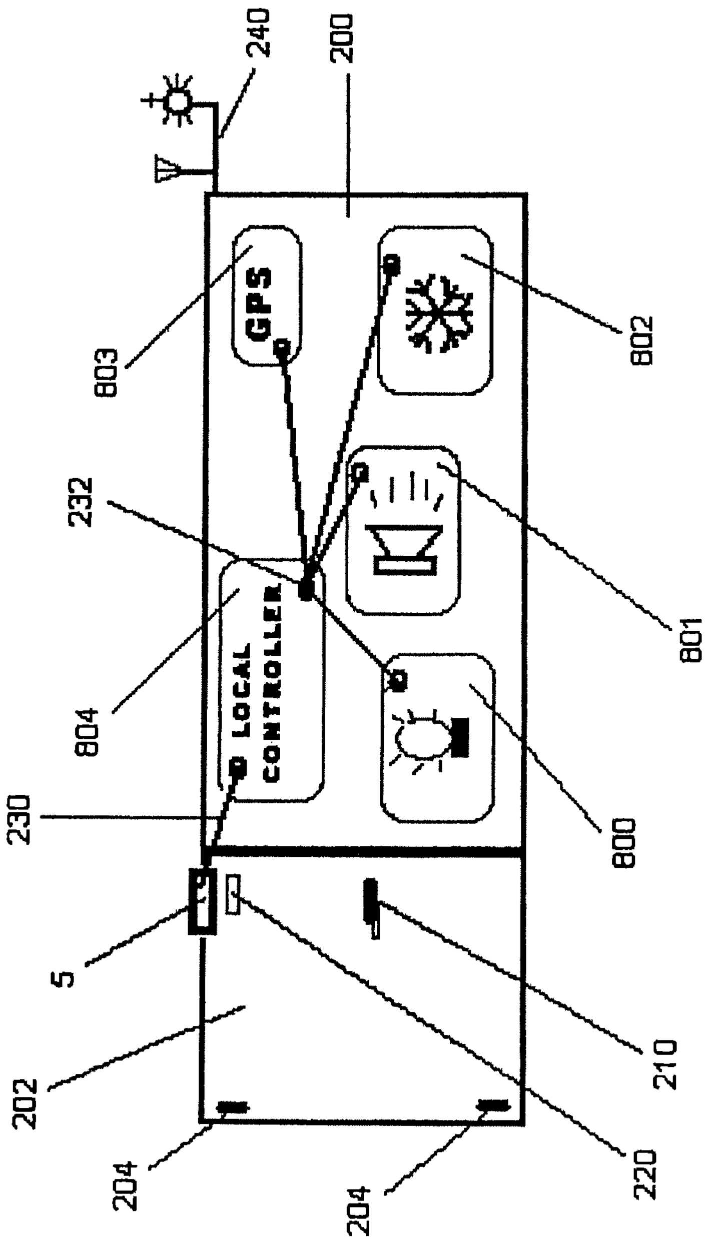
FIG. 17 shows the switch apparatus in communication with a local controller in communication with multiple devices or systems within the transportable storage container.

Referring to FIG. 17, the transportable storage container 200 of FIG. 16 is modified to have a local onboard system including a simple basic controller or interface 804 in the container 200. Preferably, the local controller 804 communicates with a single reed, reed switch apparatus 5 and the various devices or systems in the container 200 by either a wireless or wired means. FIG. 17 shows a wired communication media 230 between the reed switch apparatus 5 and the local controller 804 and a wired communication media 232 between the local controller 804 and all the different systems or devices located onboard the transportable container 200. Thus, when the reed switch apparatus 5 communicates to the local controller 804 that the opening 202 has been violated, the controller 804 initiates an audible and visual alarm indication in the onboard alarm system 801 at the container 200 and at the same time the local container's GPS system 803 transmits the container's violated opening along with the container location to the remote location 260 that houses the remote system 270. The reed switch apparatus 5 could also monitor the latching device 210 of the opening 202 on the container 200 and communicate to the local onboard controller 804 if the container's opening 202 is latched and locked with a locking device. The controller 804 could also provide powered internal lighting when the reed switch apparatus 5 indicated to the controller 804 a door 202 was opened, could control the refrigeration when an opening change was indicated or give a local visual and audible signal of its location.

The controller 804 at the transportable storage container 200 could be powered by a battery (preferably charged by a plugged-in transformer or a solar panel 240) or a second external battery source. The container's openings could be armed and disarmed by a two-way wireless key-bob that would also alert the renter if an opening has been violated from afar, much like a two-way communication car alarm system. Alternatively, a standard keypad to arm/disarm and provide all local interaction with the controller could be used.

When the portable storage container 200 is located at a storage warehouse or holding area, the onboard GPS device 803 could also communicate the status of the reed switch apparatus 5 that is attached to the opening 202, or the status of the locking device 210 on the opening, to a remote device or system 270 (FIG. 15) by a wired or wireless means to indicate an unauthorized entry of a container's opening 202, providing security and control at the holding area. This two-way communication between the container's onboard local controller 804 and the remote device or system located at the warehouse or holding area could also be used to easily locate a specific container 200 out of hundreds or thousands of containers at the warehouse or holding facility.

It is to be understood that this concept of utilizing the reed switch apparatus 5 with transportable containers can also be used to improve homeland security. By using the reed switch apparatus 5 on a storage cargo container's doors 202 that are connected to a container's local GPS device or system 803 at the container 200 to indicate via satellite to a remote device or system 270 if the container's doors 202 had been opened during sea, truck or rail transportation between points A and B would insure the container 200 had not been compromised during transportation. If the container's doors 202 that are being protected by the reed switch apparatus 5 had been compromised during transportation, the container's local GPS device 803 would immediately transmit to the remote device or system 270 which container 200 had been compromised, the time it happened, where the container 200 is located and what opening 202 on the container 200 was opened. Using the reed switch apparatus 5 on a container 200 to monitor the openings 202 would be a much more dependable and reliable means over a mechanical lock or tag that is being used today to secure a transportable container. The reed switch apparatus 5 would insure that a container 200 had not been compromised during transportation or temporary storage by a thief or terrorist.

As shown and discussed with reference to several of the embodiments described herein, reed switch apparatus 5 can be seen as a control system, arranged and designed to control a plurality of devices or systems. A plurality of the reed switches 40 in a reed switch apparatus 5 lie in very close proximity to one another such that the reed switches 40 can be activated simultaneously via exposure of the reed switch apparatus 5 to a single magnetic field. Thus, the reed switch apparatus 5 advantageously allows a simultaneous establishment of communication with multiple devices. Additionally, with other embodiments, the reed switch apparatus 5 can utilize one or more reed switches 40 to activate one or more devices, adapted for use with a warehouse storage structure—e.g., including, but not limited to lights, air conditioning systems, and the like.

Figure 18:
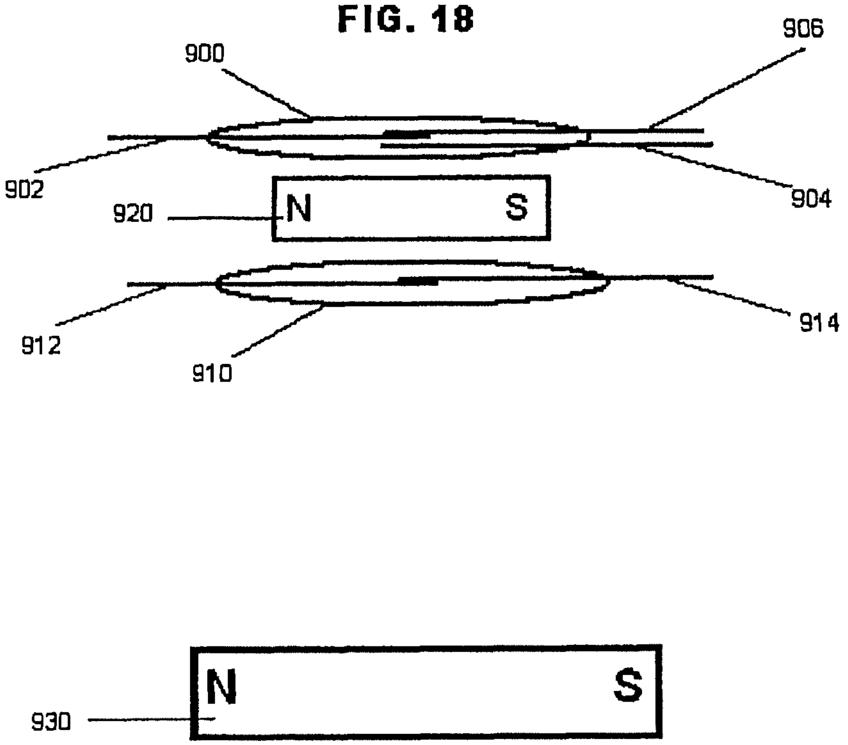
FIG. 18 shows a biased reed switch arrangement with the activation magnet removed from proximity of the reed switches.
Figure 19:
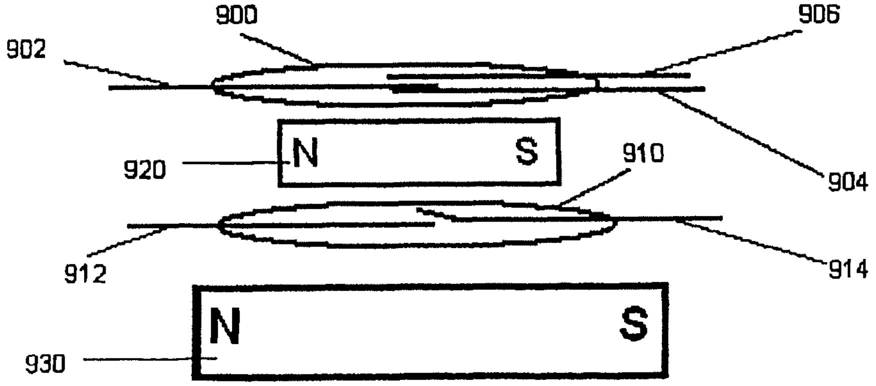
FIG. 19 shows the biased reed switch arrangement of FIG. 18 with the activation magnet proximate the reed switches.

It is to be understood that the reed switch could be biased with a biasing magnet as discussed above in the Background section. FIGS. 18 and 19 show, for exemplary purposes, a biased reed switch arrangement comprising a N.O./N.C. SPDT reed switch 900 having leads/reed contacts 902, 904 and 906, a N.C. SPST reed switch 910 having leads/reed contacts 912 and 914, a biasing magnet 920, and an actuator magnet 930. Preferably, the actuator magnet 930 has a larger magnetic flux than the biasing magnet 920. The biasing magnet 920 is in a stationary or fixed position relative to the reed switches 900 and 910.

In FIG. 18, the actuator magnet 930 is removed from the proximity of the reed switches 900 and 910 and leads/reed contacts 902 and 906 of reed switch 900 are closed and leads/reed contacts 902 and 904 are open and leads/reed contacts 912 and 914 of reed switch 910 are closed in the presence of the biasing magnet 920. In FIG. 19, the actuator magnet 930 is in proximity of the biasing magnet 920 and reed switches 900 and 910 and leads/reed contacts 902 and 906 of reed switch 900 are open and leads/reed contacts 902 and 904 are closed and leads/reed contacts 912 and 914 of reed switch 910 are open. It is to be understood that various combinations of reed switches and placement and orientation of biasing and actuator magnets are possible and within the scope of the present invention.

Alternatively or additionally, it is further to be understood that the reed switches used in the present invention could comprise various combinations and configurations as, for example, the configurations discussed in the Background section and illustrated in FIGS. 20A-E, depending on the particular situation and usage.

Figure 21:
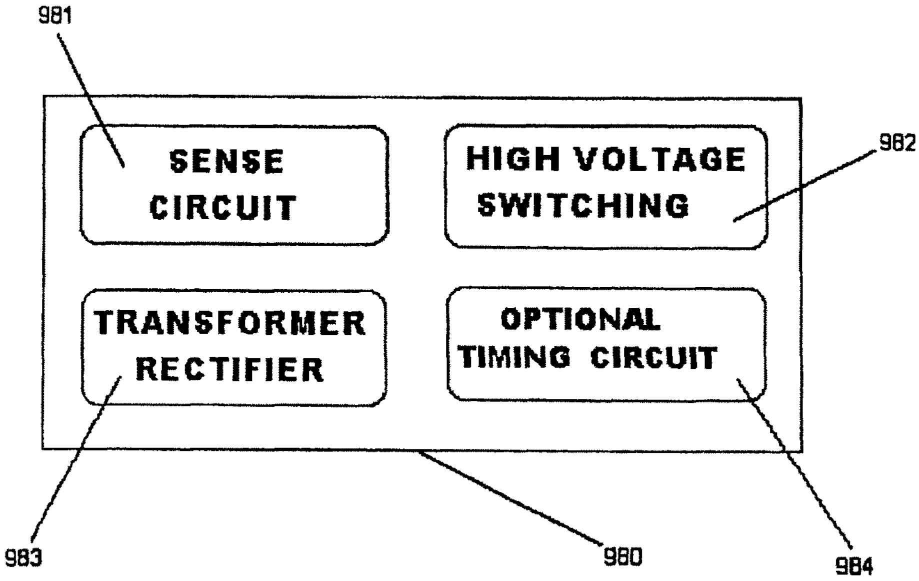
FIG. 21 shows a high voltage control module of the type used in some of the preferred embodiments of the present invention.

In certain embodiments of the present invention it may be desirable to have a high voltage control module sense circuit apparatus 980, as generally depicted in FIG. 21. The control module sense circuit apparatus 980 may be used to control the conduct of a high voltage device. Preferably, the control module 980 includes a sense circuit 981 to isolate and accept the communication of a reed switch apparatus 5 relaying the status, for example of an opening, to the sense circuit 981. The high voltage control module 980 preferably also has a mechanical or solid state switching circuit 982 to switch the high voltage from deactivated to activated along with an optional timing circuit 984 to control the amount of time the high voltage device is activated. The control module sense circuit apparatus 980 preferably has either a transformer/rectifier circuit 983 to regulate an external alternating current (VAC) power source or not, by using an external direct current power source (VDC) or a internal battery (VDC) as part of the control module 980.

It is to be expressly understood that while the reed switch apparatus 5 has been illustrated in several embodiments with regards to specific uses, it can be utilized in other settings to the extent foreseeable. For example, the reed switch apparatus 5 could be utilized next to a window. As such, the foregoing disclosure and description of the invention are only illustrative and explanatory thereof Various changes in the details of the illustrated apparatus and construction and method of operation may be made to the extent foreseeable without departing from the spirit of the invention.

I claim:

1. A transportable storage container, comprising:

a container body enclosing an interior space and having an opening;

a door attached to said container body and configured to cover said opening when closed;

a reed switch apparatus positioned at an interface between said container body and said door;

an actuation magnet attached to said container body or said door, said magnet arranged to be in close proximity to said reed switch apparatus when said door is closed, and to be distant from said reed switch apparatus when said door is open, whereby said reed switch apparatus is capable of determining whether said door is open or closed;

a local GPS device or system in wired communication with said reed switch apparatus that receives information from said reed switch apparatus about the open or closed position of said door; and a remote device or system in communication with said local GPS device or system via satellite transmission.

2. The transportable storage container of claim 1, wherein said local GPS device or system determines a time and location at which said door was opened or closed relative to the position of the door reported by the status of the reed switch wired to said GPS device or system.

3. The transportable storage container of claim 1, wherein said reed switch apparatus is in wired communication with at least one other localized device or system configured to provide a localized function depending on the position of said door, wherein said localized function includes at least one from a group consisting of a local lighting function, local locking or unlocking mechanism function, and local refrigeration system function.

4. The transportable storage container of claim 1, wherein said local GPS device or system comprises a GPS receiver and transmitter providing two-way satellite communication for remote monitoring and localized remote control functions or action, wherein said GPS receiver and transmitter includes local inputs/outputs and follower indication circuits to provide local control and monitoring of at least one of a light, an alarm indication alert, refrigeration control, opening lock/unlock control, and transportable container tracking, all depending on the position of said opening member being monitored by said reed switch apparatus.

5. The transportable storage container of claim 1, wherein said reed switch apparatus or said local GPS device or system are powered by a battery.

6. The transportable storage container of claim 5, further comprising a solar panel attached to said storage container for charging said battery.

7. A method for securing a transportable storage container having a door, comprising the steps of:

attaching a reed switch apparatus to the storage container at a location near the door and configured to determine whether the door is open or closed;

communicating information on the open or closed state of the door from said reed switch apparatus to a localized device or system;

transmitting said information from said localized device or system to a remote device or system.

8. The method of claim 7, further comprising the step of controlling a localized device or system function of said transportable storage container via two-way wireless communication with said remote device or system.

9. The method of claim 8, wherein said localized function is at least one of a lighting function, a locking or unlocking function, a refrigeration function, and an alarm function dependent on a wired communication between reed switch apparatus and local device or system.

10. The method of claim 8, further comprises transmitting from said localized device or system to said remote device or system information regarding a time and location relative to the position of the door reported by the status of the reed switch apparatus reporting to said remote device or system and waiting for a response reply control command from remote device or system to local device or system.

* * * * *